United States Patent

DeBrosse et al.

[11] Patent Number: 5,850,904
[45] Date of Patent: Dec. 22, 1998

[54] CORNER UNLOADER FOR WAREWASHER

[75] Inventors: Walter L. DeBrosse, Piqua; Louis A. Tunney, Troy, both of Ohio

[73] Assignee: Premark FEG L.L.C., Wilmington, Del.

[21] Appl. No.: 853,800

[22] Filed: May 9, 1997

Related U.S. Application Data

[60] Provisional application No. 60/017,758 May 16, 1996.

[51] Int. Cl.⁶ .................................................. B65G 25/00
[52] U.S. Cl. .................... 198/744; 198/739; 198/867.14; 134/131; 134/68
[58] Field of Search ................................. 134/124, 131, 134/68, 66, 134; 198/744, 742, 741, 739, 867.14, 465.14

[56] References Cited

U.S. PATENT DOCUMENTS

| | | |
|---|---|---|
| 1,259,653 | 3/1918 | H.M. Masterman . |
| 2,609,916 | 9/1952 | H.M. Kendall . |
| 2,733,805 | 2/1956 | Lyman ..................................... 198/19 |
| 3,103,775 | 9/1963 | Evans et al. .............................. 198/739 |
| 3,122,235 | 2/1964 | Meeker et al. ........................... 198/181 |
| 3,128,875 | 4/1964 | Kay et al. ................................. 198/743 |
| 3,128,876 | 4/1964 | Kay et al. ................................. 198/221 |
| 3,221,754 | 12/1965 | F.W. Robson et al. . |
| 3,310,150 | 3/1967 | C.R. Southard . |
| 3,384,097 | 5/1968 | D.A. Meeker et al. . |
| 3,556,288 | 1/1971 | Assauer ................................... 198/224 |
| 3,949,770 | 4/1976 | Noren ....................................... 134/60 |
| 3,985,226 | 10/1976 | Noren ..................................... 198/738 |
| 4,018,328 | 4/1977 | Galarowie et al. ..................... 198/741 |
| 4,130,195 | 12/1978 | Becker et al. ........................... 198/739 |
| 4,170,284 | 10/1979 | Lachaussee ............................. 198/345 |
| 4,371,075 | 2/1983 | Erlichman ............................... 198/345 |
| 4,515,264 | 5/1985 | Sticht ...................................... 198/344 |
| 4,523,672 | 6/1985 | Navarro .................................. 198/461 |
| 4,676,708 | 6/1987 | Mojden et al. ........................... 414/33 |
| 4,722,295 | 2/1988 | Young ..................................... 118/416 |
| 4,899,865 | 2/1990 | Keil ......................................... 198/351 |
| 5,195,630 | 3/1993 | Donovan et al. ..................... 198/465.3 |
| 5,203,446 | 4/1993 | Ufland ................................. 198/465.2 |
| 5,303,812 | 4/1994 | Strasser ............................... 198/465.2 |
| 5,329,952 | 7/1994 | Kojima et al. ......................... 134/133 |

FOREIGN PATENT DOCUMENTS

| | | |
|---|---|---|
| 1952163 | 10/1969 | Germany . |
| 574650 | 3/1958 | Italy . |
| 656594A5 | 7/1986 | Switzerland . |
| 466058 | 8/1975 | U.S.S.R. . |
| 1258257 | 12/1971 | United Kingdom . |

*Primary Examiner*—Jill Warden
*Assistant Examiner*—Paul J. Lee
*Attorney, Agent, or Firm*—Thompson Hine & Flory LLP

[57] ABSTRACT

The invention is a corner unloader for a warewasher. The corner unloader includes a frame defining a corner having an inlet end and a discharge end; a pivoting carriage mounted within the frame; the carriage comprising at least two spokes and a bracket interconnecting the spokes; a plurality of pusher elements pivotally mounted to the bracket; a drive arm for providing motion to and driving the carriage; such that retraction of the drive arm causes the carriage to rotate in a counterclockwise direction and causes pusher elements to advance any racks received on the carriage from the inlet end in a direction toward the discharge end of the unloader and extension of theorize arm causes the carriage to rotate in a clockwise direction and the pusher elements pivot under the racks, whereby repeatedly extending and retracting of the carriage pushes racks through the unloader from the inlet end to the discharge end.

8 Claims, 3 Drawing Sheets

CORNER UNLOADER FOR WAREWASHER

This application claims the benefit of U.S. Provisional Application No. 60/017,758, filed May 16, 1996.

BACKGROUND OF THE INVENTION

This invention relates to dishwashing or warewashing machines and, more particularly, to a dishrack advancing conveyor for use in conjunction with warewashing machines.

In warewashing machines of the type to which the present invention generally relates, a rack of dishes is washed and thereafter rinsed in a chamber enclosed within the machine. After the dishes are washed, they are typically conveyed to a table or unloading station where the dishes are removed from the racks and stacked for reuse. A dish rack advancing conveyor is employed for this purpose.

Typical constructions of such systems require much valuable floor space in the middle of either a kitchen or a wash room. Therefore, in many commercial kitchen designs, it is necessary to convey the racks of dishes 90 degrees around a corner to the unloading station. This allows the apparatus to fit into the corner of the room in a smaller work space in an accessible and space-saving manner. The device for conveying the dishes in this manner is known as a corner unloader.

However, typical corner unloaders are slow, inaccurate and cause jams as the trays are transferred around the corner. In addition, they must be relatively large in order to be capable of making tight turns and therefore, they increase the amount of space required for the apparatus, defeating the purpose of using a corner system.

Accordingly, there is a need for a corner unloader which reduces jamming, has a smaller area and is capable of faster movement.

SUMMARY OF THE INVENTION

The present invention is a corner unloader for a warewasher. In a preferred embodiment of the invention, the corner unloader includes a carriage driven by a pivoting arm via drive which allows the trays to make a 90° turn. The present invention allows a smaller circumference and is designed to decrease jamming of the machine. This allows the trays to have a greater travel distance in a short period of time so that the trays move out of the way quickly before the next one exits the washer.

The invention also includes a corner unloader for a warewasher comprising a frame defining a corner having an inlet end and a discharge end; a pivoting carriage mounted within the frame; the carriage comprising at least two spokes extending from a hub and a bracket interconnecting at least two of the spokes; at least one pusher element pivotally mounted to the bracket; a reciprocating drive arm for rotating the carriage about the hub; wherein movement of the drive arm in a first direction causes the carriage to rotate in a first direction and causes the pusher element to advance any racks received on the carriage from the inlet end in a direction toward the discharge end of the unloader, and movement of the drive arm in a second direction causes the carriage to rotate in an opposite direction and the pusher element pivots under the racks, whereby repeated reciprocation of the drivearm causes the carriage to advance racks through the unloader from said inlet end to the discharge end.

Other objects and advantages of the present invention will be apparent from the following description, the accompanying drawings and the appended claims.

DETAILED DESCRIPTION

Figure 1:
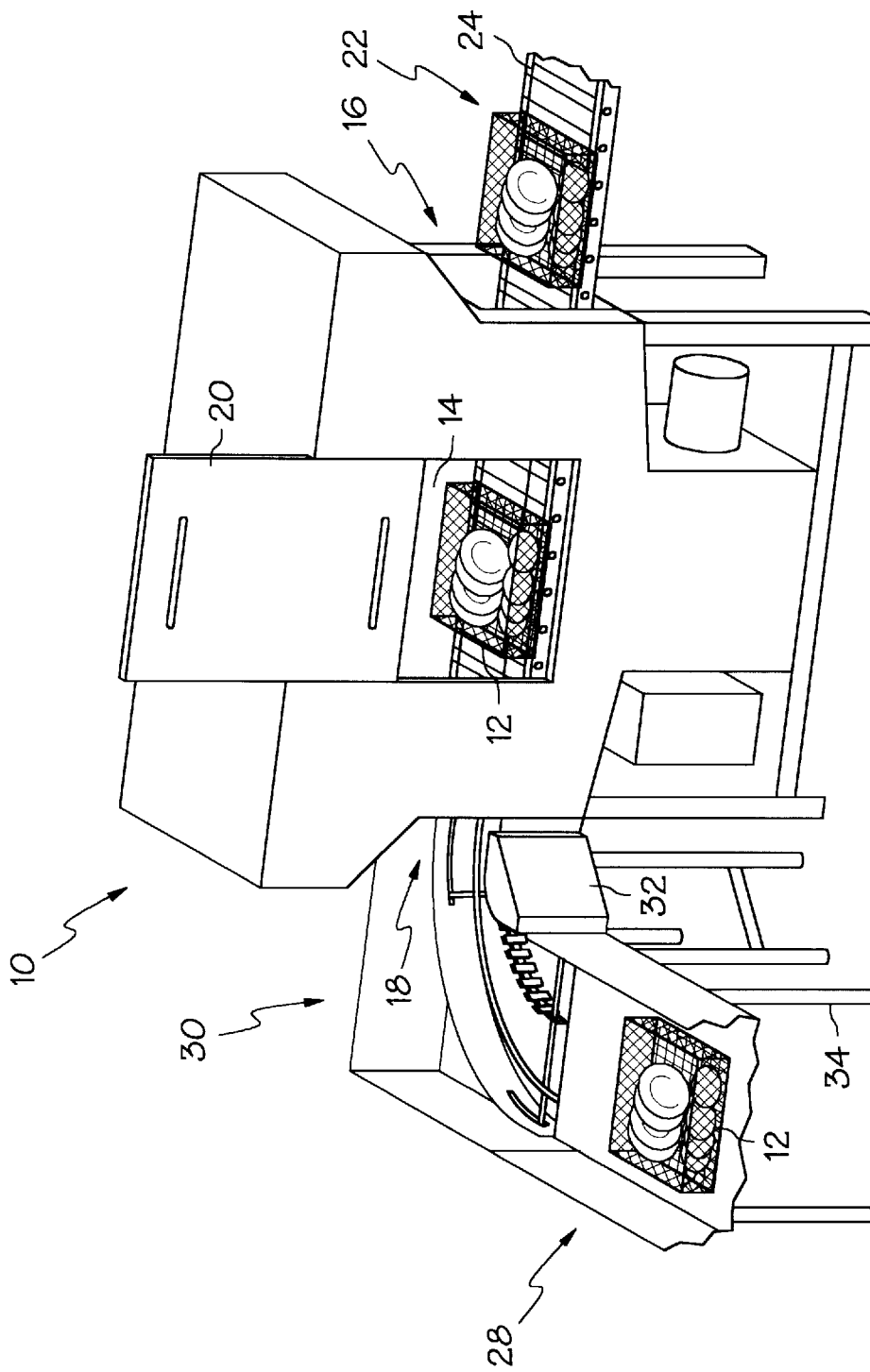
FIG. 1 is a front view of a warewasher including a corner unloader of the present invention.

As shown in FIG. 1, a warewasher generally designated 10 in accordance with the present invention receives a rack of dishes 12 to be washed. The warewasher 10 includes a washing chamber 14 having an input 16 and an output 18 for the racks or trays of dishes 12. A door 20 is provided which can be raised on guides in order to remove or replace a rack within the wash chamber 14. The warewasher 10 preferably includes a loading station 22 which leads into the input 16 and an unloading station 28 which leads away from the warewasher 10. The system utilizes a combination of a roller system and a laterally spaced rack supporting tracks for supporting the racks during loading, washing and unloading.

The loading station 22 is a straight path into the machine. The unloading station 28 of the present invention includes a corner unloading station 30 which turns the trays 12 90 degrees from the washer. The corner unloader 30 is supported by a frame 32, including a plurality of legs 34 to support the unloader at the same height as the output 18 of the warewasher. The corner unloader 30 attaches both to the output of the warewasher 10 and to the unloading station 28 which is a straight path leading away from the corner unloader.

Figure 2:
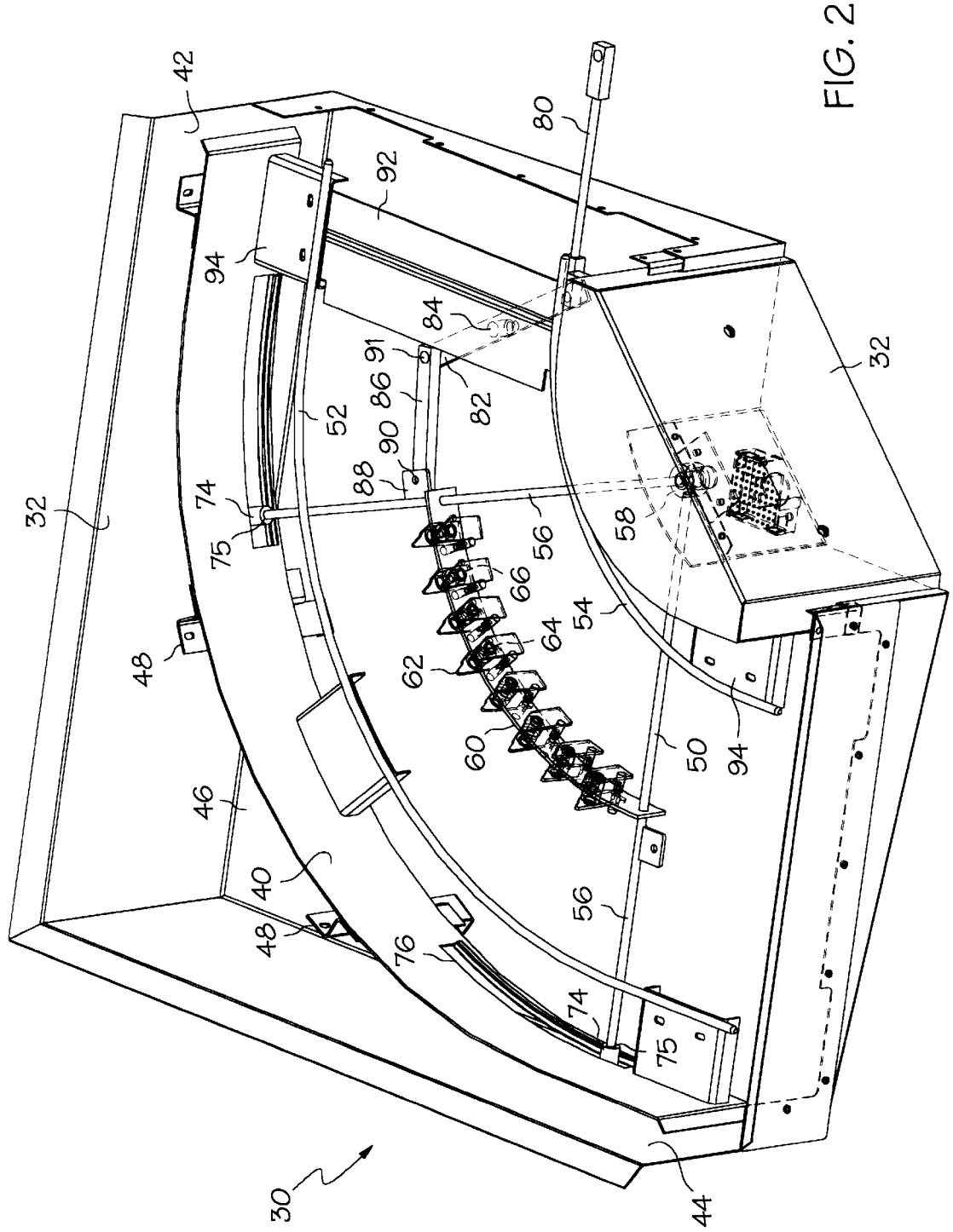
FIG. 2 is top view of the corner unloader of FIG. 1.

FIG. 2 is a detailed illustration of the corner unloader 30 in accordance with the invention. The frame 32 of the corner unloader is preferably square. A curved deflection wall 40 extends within the frame 32 from an outside corner 42 at the output end 18 of the warewasher to the outside corner 44 adjacent the unloading station and/or unloading conveyor 28. The deflection wall 40 is mounted to the frame 32 and/or the floor 46 of the unloader by a plurality of brackets 48.

The corner unloader 30 also includes a carriage 50. The carriage is pivotally mounted within the frame 32 of the corner unloader and reciprocates back and forth in order to move the racks around the 90° turn. The carriage 50 includes a plurality of spokes 56 which extend radially from a hub 58. Two spokes are shown here, but any number of spokes may be used in the carriage. The remaining spokes would be located within the two spokes shown in FIG. 2. The hub 58 is mounted in the interior corner 60 of the unloader. The spokes 56 extend from the hub 58 to at least the deflector wall 40. A curved bracket 60 is mounted between and carried by the spokes 56. This bracket may be situated half way between the deflector wall 40 and the hub 58.

The unloader 30 includes a pair of horizontally running tracks or guides 52 and 54. The arcs of these tracks substantially follow the deflector wall 40. The outer guide 52 leads from the outer corner 42 to the outer corner 44. The inner guide 54 is laterally spaced from the outer guide 52 a distance less than the width of the smallest rack that will be used, so that the guides are capable of acting as tracks for the racks. The guides 52 and 54 are at a height higher than the carriage 50.

Curved bracket 60 is laterally spaced from the inner 54 and the outer 52 tracks and carries eight pusher elements 62. The pusher elements are shaped to fit within the bottom of the racks 12. The racks conventionally have holes in them, through which the wash water drains during and after washing. Though eight pusher elements 62 are shown here, the number of pusher elements may vary. More pusher elements create a more secure grip with the racks. The pusher elements are pivotally mounted to the bracket 60 on horizontally extending posts 64 and held on either end by nuts 66 or any other suitable holding means.

Figure 3:
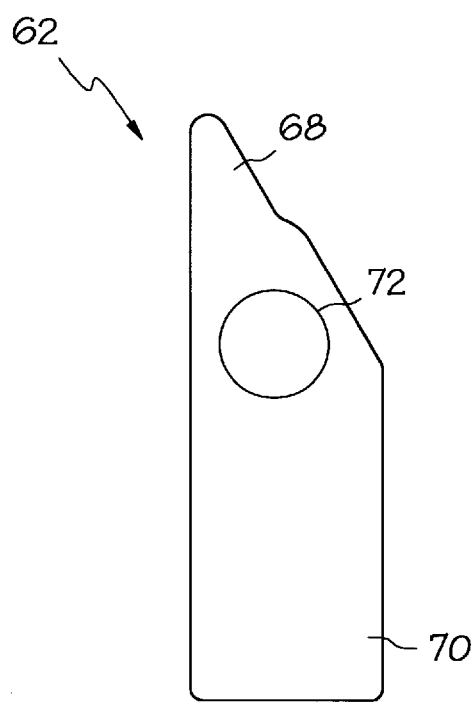
FIG. 3 is a view of a pusher element of the corner unloader of FIG. 2.

A pusher element useful in the invention is shown in more detail in FIG. 3. It has a finger portion 68 on a first end for contacting the trays and a flat portion 70 on the opposing end. The pusher 62 also includes a hole 72 through which it can be mounted on the post 64 to the bracket 60. Due to the positioning of hole 72 and the occurrence of more mass on the flat end 70, the pusher element 62 is designed and balanced such that in its normal position the finger portion 68 is in an upward position such that it will engage the rack. Thereby, when the spoke elements 56 are rotated in a counterclockwise direction, as shown in FIG. 2, from the loading side 42 of the unloader 30 to the discharge side 44, the pusher elements 62 pivot such that the finger portion 68 slides under the racks when the spokes 56 are rotated in a clockwise direction from the discharge side 44 to the loading side 42 of the unloader.

The spokes 56 of the carriage 50 preferably include rollers 74 at their distal ends 75 which ride within slots 76 in the deflector wall 40 and support the distal end 75 of the spokes as the spokes are pivoted. The number of slots corresponds to the number of spokes. However, if more than two spoke are used, not all of the spokes need extend through the deflection wall 40. Each slot must be long enough for the spokes to travel in the clockwise and counterclockwise directions as the carriage pivots back and forth. The spokes 56 are pivoted by a horizontally reciprocating drive shaft 80.

As seen in FIG. 2, the carriage is connected to a link arm 86 on spoke 56. The link arm is pivotably attached to the spoke 56 by a bracket 88. The link arm and bracket are attached through a pin 90 which allows the link arm to pivot relative to the carriage 50.

The link arm 86 is pivotally connected to the pivot arm 82 by a similar pin 91. The pivot arm is attached to the unloader through a post 84 which extends downwardly from a base plate 92 which is fixedly attached to the deflection wall 40 by a plurality of brackets 94. The pivot arm 82 is pivotally connected on one end to the link arm 86 and on the other end to a drive arm 80. The drive arm is connected to the warewash conveyor (not shown).

These linkages, i.e., the link arm, pivot arm and drive arm are all situated below the level of the carriage so that they do not interfere with movement of the trays through the unloader.

Drive shaft 80 acts on pivot arm 82 which pivots on post 84. In this manner, retraction of the drive shaft 80 causes pivot arm 82 to rotate in a counterclockwise direction and causes spokes 56 to advance the racks 12 toward the discharge end 44 of the unloader. By like token, advancement of the drive shaft 80 pivots the pivot arm 82 in a clockwise direction and retracts the spokes 56 such that pusher elements 62 slide under any racks in the unloader. In this manner, by repeatedly extending and retracting drive shaft 80, a rack of dishes can be advanced through corner unloader 30 and discharged to the unloading conveyor or unloading station 28. Any conventional longitudinal drive means can be used to reciprocate the drive shaft 80.

The corner unloader described throughout this application is assuming a right to left operation of racks flowing through the machine. However, the unloader of this invention is equally viable for left to right operation. For a left to right operating machine the function of the unloader is the same but when drive arm 80 is pulled toward the dishwasher the carriage goes clockwise not counterclockwise as on a right to left machine.

The system of the present invention provides a greater travel for the racks for each reciprocation of the carriage thus producing greater speed in turning the corner. This reduces jamming of the racks since one rack can traverse the corner unloader quickly to get out of the way of the next rack. In addition, since the system is quick, more racks can be cleaned and moved on in a shorter period of time and the trays rub less on the deflection wall 40. Depending on the dishwasher, an exemplary corner unloader can move 230 racks per hour. Further, the present invention allows a sharper turning radius and thus a smaller corner unloader can be used. This is important for space savings in the kitchen. For example a 48-inch square unloader can be reduced to a 38-inch square unloader by using the system of the present invention. Finally, the unloader of the present invention is more circular than conventional unloaders further enhancing the small turning radius.

While this application illustrates one specific embodiment of the invention, it will be apparent that numerous modifications and variations are possible without departing from the spirit and scope of the invention defined in the appended claims. In addition, while the invention has been described with respect to a corner unloader, the system is equally usable for a loader. Further, the corner unloader is described as turning 90 degrees. The corner unloader may also turn greater or less than 90 degrees without departing from the scope of the present invention.

What is claimed is:

1. A corner unloader for unloading racks of dishes from a warewasher comprising:

a frame defining a corner having an inlet end and a discharge end;

a pivoting carriage mounted within said frame;

said carriage comprising at least two spokes extending from a hub and a bracket interconnecting at least two of said spokes;

at least one pusher element pivotally mounted to said bracket;

a reciprocating drive arm for rotating said carriage about said hub;

wherein movement of said drive arm in a first direction causes the carriage to rotate in a first direction and causes said pusher element to advance any racks received on said carriage from said inlet end toward said discharge end of said unloader and movement of said drive arm in a second direction causes said carriage to rotate in an opposite direction and said pusher element pivots under said racks, whereby repeated reciprocation of said drive arm causes said carriage to advance racks through said unloader from said inlet end to said discharge end.

2. The corner unloader of claim 1 further comprising a linkage arm connected to said carriage and a pivot arm connected on one end to said linkage arm and on a second end to said drive arm such that said drive arm causes said pivot arm to pivot, thus causing reciprocation of said carriage.

3. The corner unloader of claim 1 further comprising a curved deflector wall, said wall containing elongate slots therein such that said at least two spokes extend to and are supported by said elongate slots.

4. The corner unloader of claim 1 wherein said at least one pushing element is pivotally attached to said bracket by a post.

5. The corner unloader of claim 4 wherein said at least one pusher element is shaped and balanced such that in an unaltered position a finger portion is in an upward position such that said finger portion will engage a rack, and said at least one pusher element pivots such that said finger portion slides under the rack when said carriage is reciprocated.

6. The corner unloader of claim 1 wherein said frame is substantially square and said carriage has a substantially circular radius.

7. The corner unloader of claim 1 wherein retraction of said drive arm causes said carriage to rotate in a counter-clockwise direction and extension of said drive arm causes said carriage to rotate in a clockwise direction.

8. The corner unloader of claim 1 wherein said at least one pusher element comprises eight pusher elements.

* * * * *